US006877158B1

(12) United States Patent
Arndt

(10) Patent No.: US 6,877,158 B1
(45) Date of Patent: Apr. 5, 2005

(54) LOGICAL PARTITIONING VIA HYPERVISOR MEDIATED ADDRESS TRANSLATION

(75) Inventor: Richard Louis Arndt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 09/589,795

(22) Filed: Jun. 8, 2000

(51) Int. Cl.[7] .................................................. G06F 9/46
(52) U.S. Cl. ....................... 718/104; 718/100; 718/102; 711/202; 711/203; 711/206
(58) Field of Search ................. 709/100, 104, 709/102; 711/202, 260, 203, 147, 206

(56) References Cited

U.S. PATENT DOCUMENTS

| 4,843,541 A | * | 6/1989 | Bean et al. ..................... 710/36 |
| 4,914,577 A | * | 4/1990 | Stewart et al. ............... 711/207 |
| 5,381,537 A | * | 1/1995 | Baum et al. ................. 711/206 |
| 5,684,974 A | * | 11/1997 | Onodera ...................... 711/202 |
| 5,708,790 A | * | 1/1998 | White et al. ................ 711/203 |
| 5,781,750 A | * | 7/1998 | Blomgren et al. ........... 712/209 |
| 6,212,614 B1 | * | 4/2001 | Hoerig et al. ................ 711/209 |
| 6,279,046 B1 | * | 8/2001 | Armstrong et al. ............ 710/5 |
| 6,418,523 B2 | * | 7/2002 | Porterfield ................... 711/207 |
| 6,467,007 B1 | * | 10/2002 | Armstrong et al. ......... 710/260 |
| 6,469,799 B1 | * | 10/2002 | Kajita ....................... 358/1.16 |
| 6,510,496 B1 | * | 1/2003 | Tarui et al. ................. 711/147 |
| 2002/0105523 A1 | * | 8/2002 | Behrbaum et al. .......... 345/543 |
| 2003/0009648 A1 | * | 1/2003 | Doing et al. ................ 711/202 |

* cited by examiner

*Primary Examiner*—Meng-Al T. An
*Assistant Examiner*—Lilian Vo
(74) *Attorney, Agent, or Firm*—Duke W. Yee; Mark E. McBurney; Lisa L. B. Yociss

(57) ABSTRACT

A method, system, and apparatus for mediating address translation in a logically partitioned data processing system is provided. In one embodiment, a firmware component receives from an operating system within a logical partition a request to access a physical resource. The firmware component, responsive to a determination that the physical resource has been allocated to the logical partition, modifies an address translation table, if necessary, to allow access to the physical resource by the operating system. The operating system is prevented from directly modifying the address translation table, thus preventing potential interference between operating systems within the logically partitioned data processing system.

19 Claims, 4 Drawing Sheets

LOGICAL PARTITIONING VIA HYPERVISOR MEDIATED ADDRESS TRANSLATION

BACKGROUND OF THE INVENTION

1. Technical Field

The present invention relates generally to the field of computer architecture and, more specifically, to methods and systems for managing resources among multiple operating system images within a logically partitioned data processing system.

2. Description of Related Arts

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other, such that software errors on one logical partition cannot affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

A significant problem in an LPAR computer system is the mechanism that performs the isolation of partition resources from each other.

In some previous implementations, such as, for example, the IBM S/390, a product of the International Business Machines Corporation of Armonk, N.Y., the platform included extra hardware in each processor that added a fixed offset to all processor generated addressed. The added hardware also checked to make sure that the resulting address did not exceed a specific upper value. This extra hardware is made inaccessible to the logical partition's OSs. However, this method forces all the logical partition's directly accessible resources to be configured in a single (or at most a few) contiguous regions of the platform's address space. Other partition resources, such as, for example, sparsely mapped memory and mapped input/output (I/O) devices, must be accessed indirectly through platform firmware.

Another popular method, employed by Sun Micro-Systems, Inc., as well as Intel based systems, is to electrically disconnect, in some fashion, the bus between sub-sets to be configured with the complete set of resources that the partition needs. Thus, changing a partition's resource configuration often involves physically moving hardware between the sub-sets.

Therefore, it is desirable to have a method, system, and apparatus that isolates partition resources from each other while allowing fine grain allocation of resources to partitions without necessitating the physical movement of the hardware during reconfiguration.

SUMMARY OF THE INVENTION

The present invention provides a method, system, and apparatus for mediating address translation in a logically partitioned data processing system. In one embodiment, a firmware component receives from an operating system within a logical partition a request to access a physical resource. The firmware component, responsive to a determination that the physical resource has been allocated to the logical partition, modifies an address translation table, if necessary, to allow access to the physical resource by the operating system. The operating system is prevented from directly modifying the address translation table, thus preventing potential interference between operating systems within the logically partitioned data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
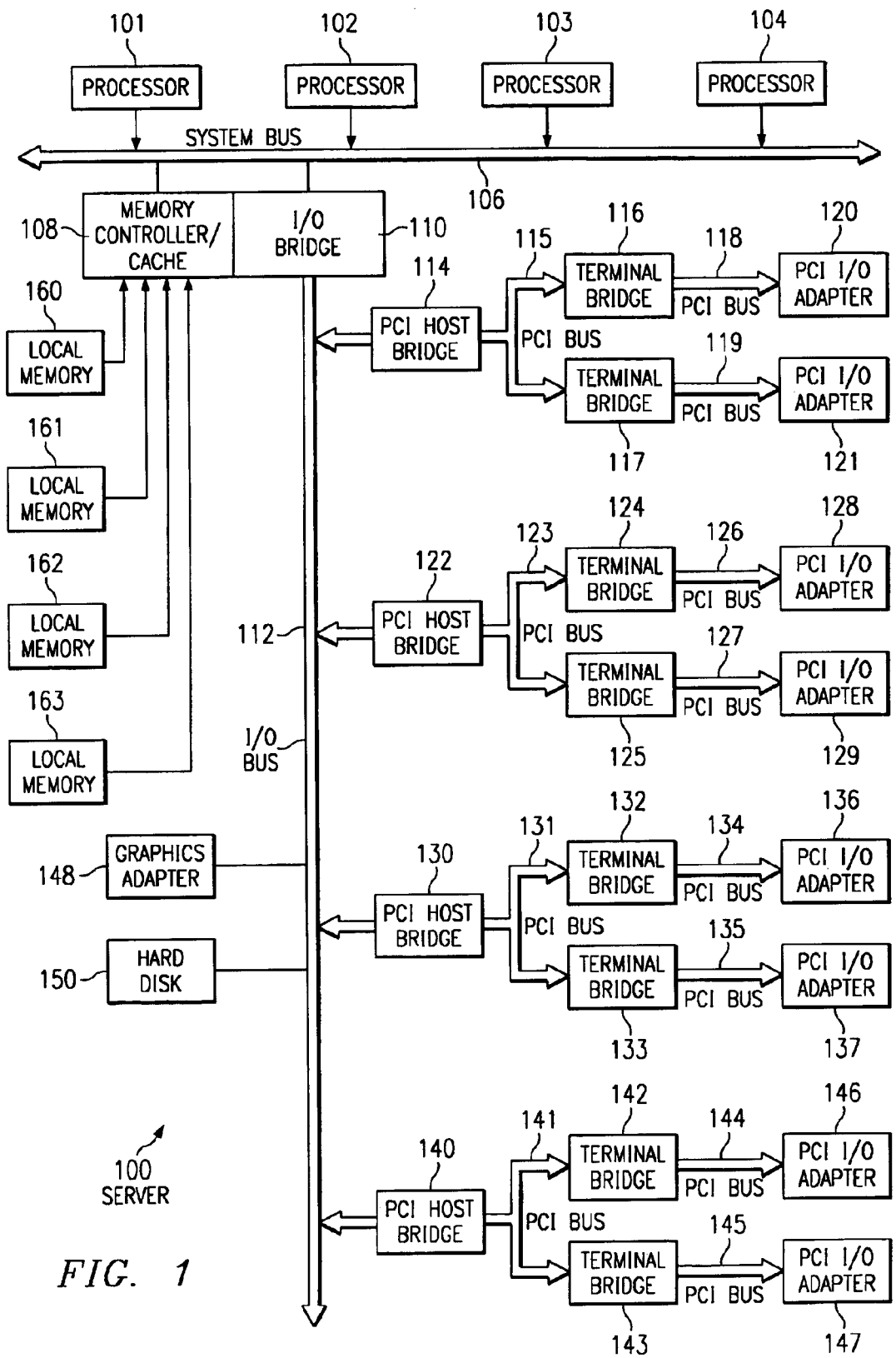
FIG. 1 depicts a block diagram of a data processing system, which may be implemented as a logically partitioned server, in accordance with the present invention.

With reference now to the figures, and in particular with reference to FIG. 1, a block diagram of a data processing system, which may be implemented as a logically partitioned data processing system, is depicted in accordance with the present invention. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136–137, and 146–147 may be assigned to different logical partitions.

Thus, for example, suppose data processing system 100 is divided into three logical partitions, P1, P2, and P3. Each of I/O adapters 120–121, 128–129, and 136–137, each of processors 101–104, and each of local memories 160–164 is assigned to one of the three partitions. For example, processor 101, memory 160, and I/O adapters 120, 128, and 129 may be assigned to logical partition P1; processors 102–103, memory 161, and I/O adapters 121 and 137 may be assigned to partition P2; and processor 104, memories 162–163, and I/O adapters 136 and 146–147 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000™ operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Terminal Bridges 116–117 may be connected to PCI bus 115. Typical PCI bus implementations will support four Terminal Bridges for providing expansion slots or add-in connectors. Each of Terminal Bridges 116–117 is connected to a PCI I/O Adapter 120–121 through a PCI Bus 118–119. Each I/O Adapter 120–121 provides an interface between data processing system 100 and input/output devices such as, for example, other network computers, which are clients to server 100. Only a single I/O adapter 120–121 may be connected to each terminal bridge 116–117. Each of terminal bridges 116–117 is configured to prevent the propagation of errors up into the PCI Host Bridge 114 and into higher levels of data processing system 100. By doing so, an error received by any of terminal bridges 116–117 is isolated from the shared buses 115 and 112 of the other I/O adapters 121, 128–129, and 136–137 that may be in different partitions. Therefore, an error occurring within an I/O device in one partition is not "seen" by the operating system of another partition. Thus, the integrity of the operating system in one partition is not effected by an error occurring in another logical partition. Without such isolation of errors, an error occurring within an I/O device of one partition may cause the operating systems or application programs of another partition to cease to operate or to cease to operate correctly.

Additional PCI host bridges 122, 130, and 140 provide interfaces for additional PCI buses 123, 131, and 141. Each of additional PCI buses 123, 131, and 141 are connected to a plurality of terminal bridges 124–125, 132–133, and 142–143 which are each connected to a PCI I/O adapter 128–129, 136–137, and 146–147 by a PCI bus 126–127, 134–135, and 144–145. Thus, additional I/O devices, such as, for example, modems or network adapters may be supported through each of PCI I/O adapters 128–129, 136–137, and 146–147. In this manner, server 100 allows connections to multiple network computers. A memory mapped graphics adapter 148 and hard disk 150 may also be connected to I/O bus 112 as depicted, either directly or indirectly. Hard disk 150 may be logically partitioned between various partitions without the need for additional hard disks. However, additional hard disks may be utilized if desired.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
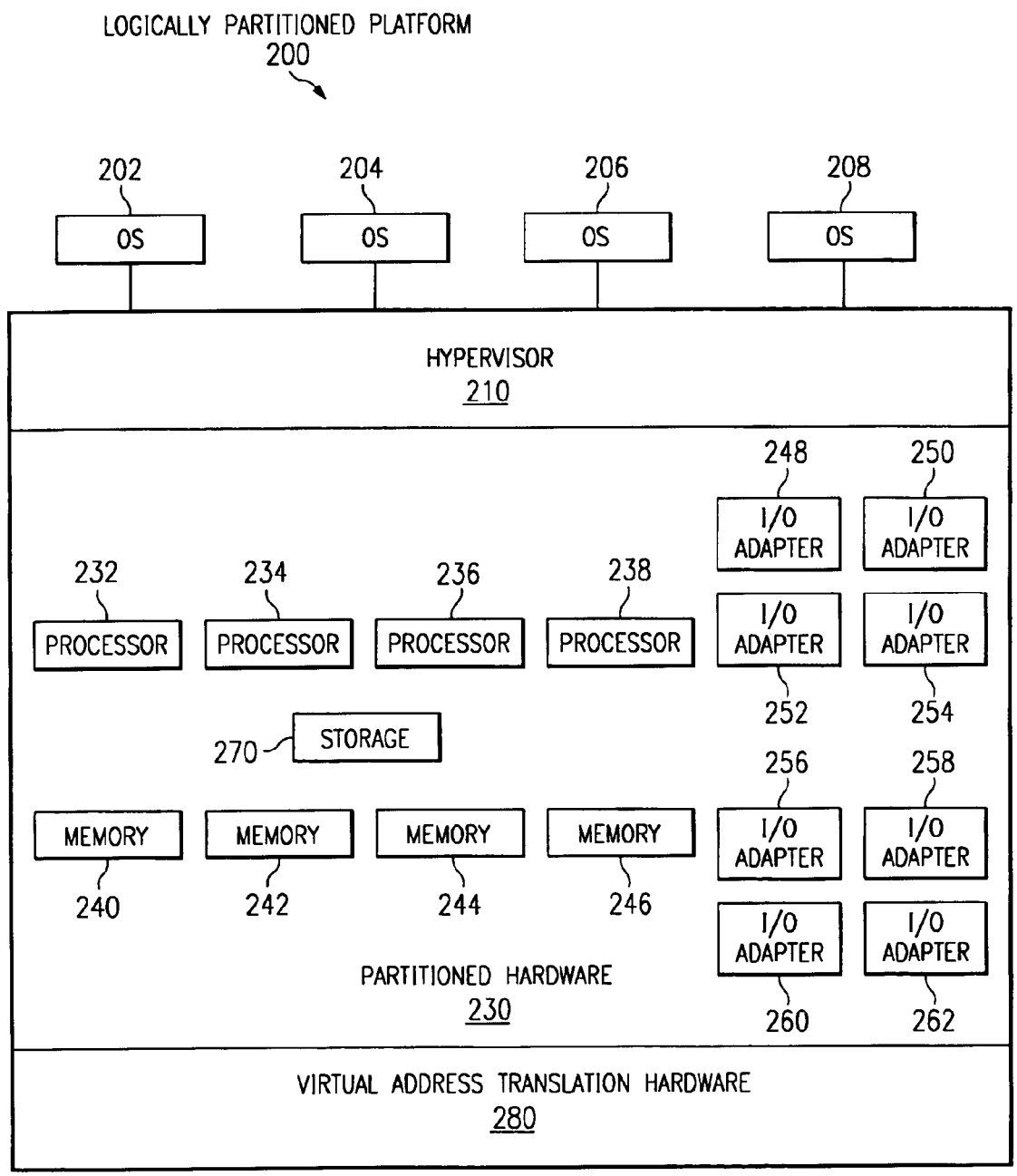
FIG. 2 depicts a block diagram of a logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, data processing system 100 in FIG. 1. Logically partitioned platform 200 includes partitioned hardware 230, virtual address translation hardware 280, hypervisor 210, and operating systems 202–208. Operating systems 202–208 may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, and I/O adapters 248–262 may be assigned to one of multiple partitions within logically partitioned platform 200, each of which corresponds to one of operating systems 202–208.

Hypervisor 210, implemented as firmware, creates and enforces the partitioning of logically partitioned platform 200. Firmware is software stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Virtual address translation hardware 280 provides a mechanism for translating one of OSs', 202–208 virtual memory address pages for a resource to a physical hardware address corresponding to that resource. Virtual memory is a method of simulating more memory than actually exists, allowing platform 200 to run larger software programs or more programs concurrently. Virtual memory breaks up the software program into small segments, called pages, and brings as many pages into memory 240–246 that fit into a reserved area for that software program. When additional pages are required, the virtual memory makes room for them by swapping pages currently in memory but no longer needed to disk storage 270 or some other input/output device through one of I/O adapters 248–260, thus freeing up memory for the additional pages. The virtual address translation hardware 280 keeps track of pages that have been modified, so that the modified pages can be retrieved when needed again.

In the prior art, the platform's virtual address translation hardware 280 was under the direct control of each OS 202–208 within the platform 200. However, such direct control allowed for the possibility that one of OSs 202–208 might read or corrupt data in a resource allocated to a different one of OSs 202–208 than the requesting one of OSs 202–208. Thus, the present invention removes the virtual address translation hardware 280 from the direct control of the OSs 202–208. Instead, hypervisor 210 controls platform's 200 virtual address translation hardware 280.

When one of OSs 202–208 needs access to a specific resource, the particular one of OSs 202–208 must establish a virtual to real mapping for the input/output resource. However, instead of directly modifying the virtual address translation page frame table, the OS 202–208 makes a request to hypervisor 210 to access the resource. Hypervisor 210 checks that the real resource, to which one of OSs 202–208 has requested access, has been allocated to the requesting one of OSs 202–208 before hypervisor 210 completes the mapping. If the real resource has been allocated to the one of OSs 202–208 requesting the mapping, hypervisor 210 then performs the final stage of the mapping.

The single hardware pointer to the virtual address translation page frame table in each of processors 232–238 is made unmodifiable by any of OSs 202–208. Each processor 232–238 contains a register that points to its page table, such that the processor's virtual memory translation hardware is aware of where to find the virtual to physical address mappings. This is standard art for memory address translation hardware. In the depicted embodiment, each OS image 202–208 has its own page table such that each OS image 202–208 can have its own virtual address 1, 1000, 1000000, etc. Furthermore, the page table pointer register of each of processors 232–238 assigned to a particular one of OS images 202–208 contains the same value (i.e. the starting physical address of the page table in platform memory). Each of OSs 202–208 contains an instruction that allows the OS to make request of the hypervisor 210 to perform the virtual address resource mapping.

Those of ordinary skill in the art will appreciate that the hardware and software depicted in FIG. 2 may vary. For example, more or fewer processors and/or more or fewer operating system images may be used than those depicted in FIG. 2. The depicted example is not meant to imply architectural limitations with respect to the present invention.

Figure 3:
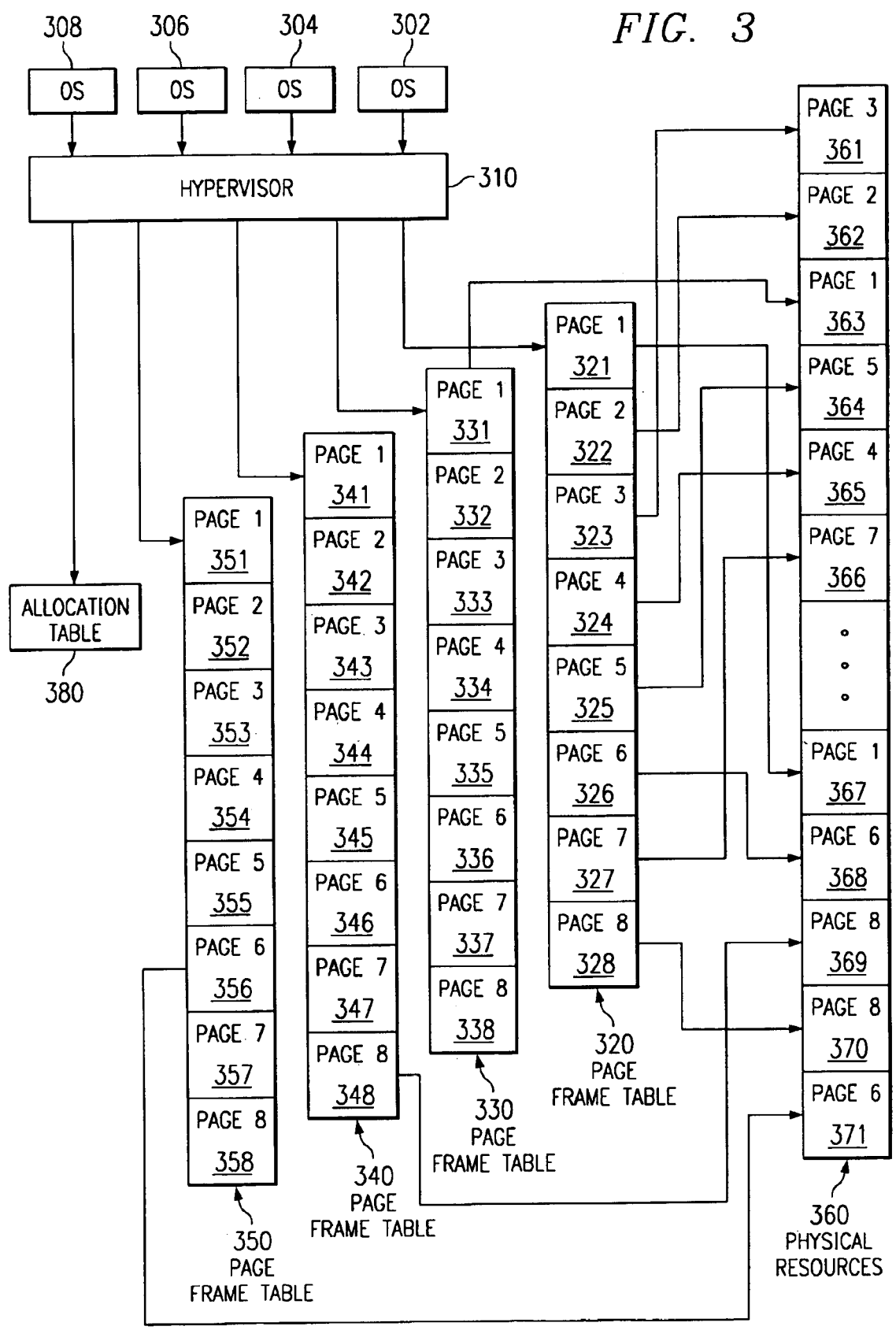
FIG. 3 depicts a block diagram illustrating an exemplary system for mediating virtual address translation in accordance with the present invention.

With reference now to FIG. 3, a block diagram illustrating an exemplary system for mediating virtual address translation is depicted in accordance with the present invention. Mediated address translation system 300 includes multiple operating systems (OSs) 302–308, a hypervisor 310, an allocation table 380, a page frame table per OS image 320–350, and physical resources 360. Mediated address translation system 300 may be implemented within a data processing system, such as, for example, platform 200 depicted in FIG. 2. Hypervisor 310 may be implemented as, for example, hypervisor 210 in FIG. 2, and OSs 302–308 may be implemented as, for example, OSs 202–208 in FIG. 2.

Physical resources 360 includes physical resources 367–371 which may be implemented as input/output devices connected to a platform, such as, for example, platform 200 via input/output adapters 248–262 in FIG. 2, as sections of memory or memories, such as for example, one of memories 240–246 in FIG. 2, or as sections of a storage device, such as for example, storage 270 in FIG. 2. Physical resources 360 is divided into fixed size page frames 361–371, typically 4 KB each.

Page frame tables 320–350 each contain a table of translations of OS virtual addresses to actual physical addresses to physical resources 360. In the depicted embodiment, each page frame table contains mappings for virtual Pages 1–8 321–328 for OS image 302, 331–338 for OS image 304, 341–348 for OS image 306 and 351–358 for OS image 308. Thus, as depicted, OS image's 302 Page 1 321 is mapped to page frame 367. Others of OS image's 302 pages 2–8 322–328 are mapped to various others of page frames 361–371. As depicted in FIG. 3, there is no requirement that the pages used by the OSs 302–308 be stored consecutively in the physical resources 360.

Furthermore, there is no requirement that a page frames 361–371 in physical resources 360 be allocated such that each of the page frames 361–371 allocated to a particular partition be grouped consecutively. Thus, the page frames 361–371 may be assigned in a disjointed fashion such that, for example, page frame 361 is assigned to OS 302, page frame 363 is assigned to OS 304, page frame 371 is assigned to OS 308, page frame 362 is assigned to OS 302, page frame 369 is assigned to OS 306, and so on. Therefore, the present invention allows for a very fine grain allocation of resources to the various logical partitions. Furthermore, the allocations of physical resources are easily modified by changes to hypervisor address checking tables, such as, for example, the allocation table 380, without the need for hardware reconfiguration as some prior art methods required.

Each of OSs 302–308, when access to a physical resource 350 is desired, sends a request to hypervisor 310 to map a virtual address into a physical address. Hypervisor 310, after receiving the request, consults an allocation table to ensure that the physical resource requested by the OS 302–308 has been allocated to that particular requesting OS 302–308. If hypervisor 310 determines that the requested resource has not been allocated to the requesting OS 302–308, then hypervisor 310 returns an error message to the requesting OS 302–308 indicating that the request has been denied. Thus, hypervisor 310 prevents an OS 302–308 in one partition from fetching or corrupting data in a resource allocated to an OS 302–308 in a different partition, thereby maintaining the integrity of the logically partitioned data processing system.

If the requested resource has been allocated to the requesting OS 302–308, then hypervisor 310 modifies page frame table 320, if necessary, such that the OS's 302–308 virtual address is mapped to the corresponding physical address of the requested resource. The various OSs 302–308 are prevented from modifying page frame table 320, thus further ensuring that the logical partitions within the data processing system are maintained.

Other prior art methods incorporated the virtual address translation hardware into their firmware. However, these other prior art methods incorporated the entire virtual translation function into their firmware rather than merely allowing the firmware to modify the page frame table after consulting an allocation table. Thus, these other prior art methods forced significantly greater changes in a standard UNIX operating system and they introduced other mechanisms for partitioning the I/O that greatly complicated their design. Thus, the present invention is much simpler to incorporate into existing OSs and simpler to implement in firmware.

Figure 4:
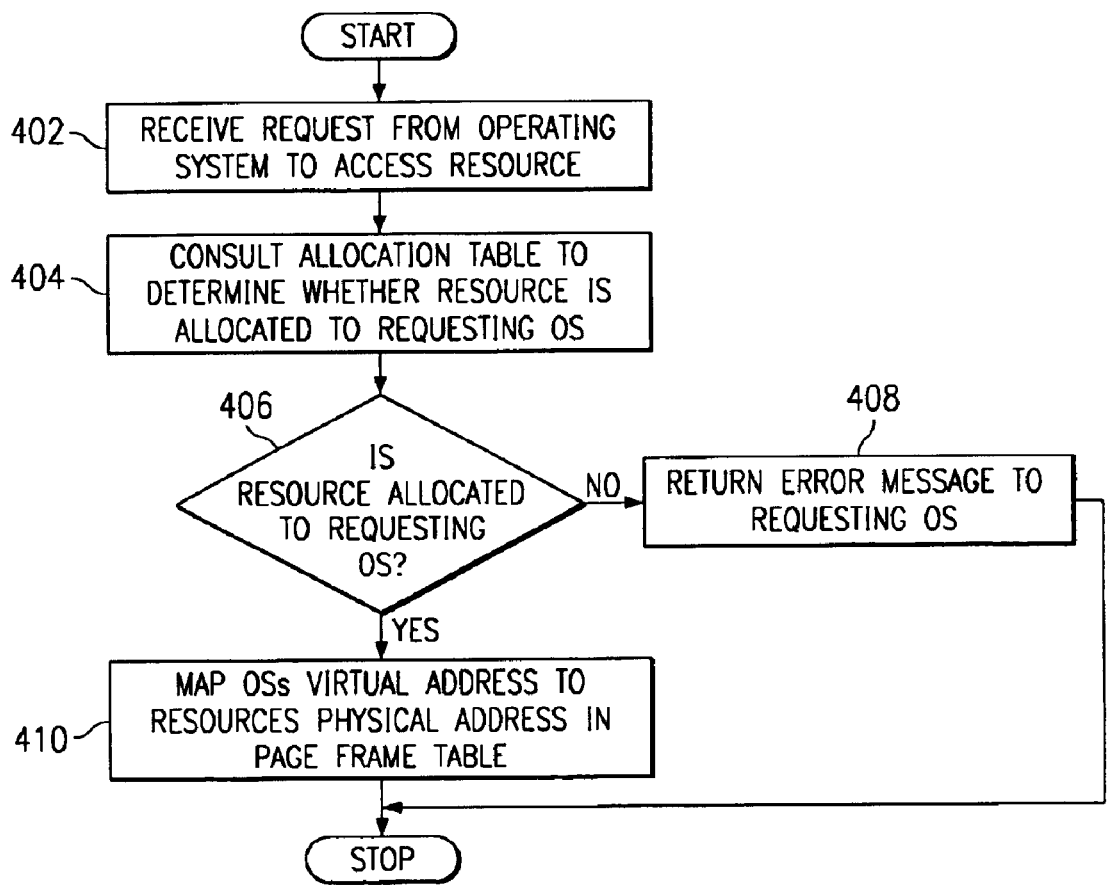
FIG. 4 depicts a flowchart illustrating an exemplary process in a firmware component for mediating address translation between various operating systems and physical resources in a logically partitioned data processing system in accordance with the present invention.

With reference now to FIG. 4, a flowchart illustrating an exemplary process in a firmware component, such as, for example, hypervisor 210 in FIG. 2, for mediating address translation between various operating systems in a logically partitioned data processing system and physical resources is depicted in accordance with the present invention. To begin, the firmware component receives a request from one of multiple operating systems within a logically partitioned platform to access (read or write to) a physical resource, such as, for example, an I/O device connected to I/O adapter 248 in FIG. 2 (step 402). The firmware component consults an allocation table (step 404) to determine whether the resource to which the OS requested access has been allocated to the requesting OS (step 406).

After consulting the allocation table, if the firmware component makes the determination that the requested resource has not been allocated to the requesting OS, then an error message is returned to the requesting OS indicating that access to such resource is denied (step 408). In such case, the firmware component does not make any modifications to the page frame table, which maps the OSs virtual addresses to the physical addresses of the corresponding resources. If the firmware component makes the determination that the requested resource has been allocated to the requesting OS, then the firmware component modifies the page frame table such that the OSs virtual address is mapped to the resources physical address (step 410).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for mediating address translation in a logically partitioned data processing system having a set of logical partitions with an operating system assigned to each logical partition within the set of logical partitions, the method comprising:

associating a different contiguous range of virtual address pages of virtual addresses with each one of said set of logical partitions;

assigning a noncontiguous group of page frames of physical addresses to each one of said different contiguous range of virtual address pages, each one of said set of logical partitions being assigned a different noncontiguous group of page frames;

wherein the physical addresses are addresses corresponding to physical location of resources within the logically partitioned data processing system;

receiving from an operating system within a logical partition from the set of logical partitions a request to access a physical resource;

responsive to a determination that the physical resource has been allocated to the logical partition, selectively modifying an address translation table to allow access to the physical resource by the operating system.

2. The method as recited in claim 1, further comprising: responsive to a determination that the physical resource is allocated to a different logical partition in the set of logical partitions, refraining from modifying the address translation table.

3. The method as recited in claim 2, further comprising: sending a message to the operating system indicating that the request is denied.

4. The method as recited in claim 1, wherein the address translation table comprises a table of virtual addresses with corresponding physical addresses, wherein the virtual addresses are addresses utilized by the operating system.

5. The method as recited in claim 4, wherein the physical addresses are allocated to various ones of multiple logical partitions in a disjoint fashion.

6. The method as recited in claim 4, wherein consecutive virtual addresses need not correspond to consecutive physical addresses.

7. A computer program product in a computer readable media for use in a logically partitioned data processing system for mediating address translation in a logically partitioned data processing system having a set of logical partitions with an operating system assigned to each logical partition in the set of logical partitions, the computer program product comprising:

instructions for associating a different contiguous range of virtual address pages of virtual addresses with each one of said set of logical partitions;

instructions for assigning a noncontiguous group of page frames of physical addresses to each one of said different contiguous range of virtual address pages, each one of said set of logical partitions being assigned a different noncontiguous group of page frames;

wherein the physical addresses are addresses corresponding to physical location of resources within the logically partitioned data processing system;

instructions for receiving from an operating system within a logical partition from the set of logical partitions a request to access a physical resource;

instructions, responsive to a determination that the physical resource has been allocated to the logical partition, for selectively modifying an address translation table to allow access to the physical resource by the operating system.

8. The computer program product as recited in claim 7, further comprising:

instructions, responsive to a determination that the physical resource is allocated to a different logical partition in the set of logical partitions, for refraining from modifying the address translation table.

9. The computer program product as recited in claim 8, further comprising:

instructions for sending a message to the operating system indicating that the request is denied.

10. The computer program product as recited in claim 7, wherein the address translation table comprises a table of virtual addresses with corresponding physical addresses, wherein the virtual addresses are addresses utilized by the operating system.

11. The computer program product as recited in claim 10, wherein the physical addresses are allocated to various ones of multiple logical partitions in a disjoint fashion.

12. The computer program product as recited in claim 10, wherein consecutive virtual addresses need not correspond to consecutive physical addresses.

13. A system for use in a logically partitioned data processing system for mediating address translation in a logically partitioned data processing system having a set of logical partitions with an operating system assigned to each logical partition in the set of logical partitions, the system comprising:

a different contiguous range of virtual address pages of virtual addresses being associated with each one of said set of logical partitions;

a noncontiguous group of page frames of physical addresses being assigned to each one of said different contiguous range of virtual address pages, each one of said set of logical partitions being assigned a different noncontiguous group of page frames;

wherein the physical addresses are addresses corresponding to physical location of resources within the logically partitioned data processing system;

first means for receiving from an operating system within a logical partition from the set of logical partitions a request to access a physical resource;

second means, responsive to a determination that the physical resource has been allocated to the logical partition, for selectively modifying an address translation table to allow access to the physical resource by the operating system.

14. The system as recited in claim 13, further comprising:

third means, responsive to a determination that the physical resource is allocated to a different logical partition in the set of logical partitions, for refraining from modifying the address translation table.

15. The system as recited in claim 14, further comprising:

fourth means for sending a message to the operating system indicating that the request is denied.

16. The system as recited in claim 13, wherein the address translation table comprises a table of virtual addresses with corresponding physical addresses, wherein the virtual addresses are addresses utilized by the operating system.

17. The system as recited in claim 16, wherein the physical addresses are allocated to various ones of multiple logical partitions in a disjoint fashion.

18. The system as recited in claim 16, wherein consecutive virtual addresses need not correspond to consecutive physical addresses.

19. A logically partitioned data processing system, comprising:

a plurality of operating systems executing within the logically partitioned data processing system, each of the plurality of operating systems assigned to one of a plurality of logical partitions;

a different contiguous range of virtual address pages of virtual addresses being associated with each one of the partitions;

a noncontiguous group of page frames of real memory address being assigned to each one of said different contiguous range of virtual address pages, each one the logical partitions being assigned a different noncontiguous group of page frames;

a plurality of physical resources, each assigned to one of the plurality of logical partitions; and a mediating component for providing address translation between each of a plurality of virtual addresses belonging to various ones of the plurality of operating systems and a corresponding one of a plurality of physical addresses belonging to various ones of the plurality of physical resources; wherein the mediating component determines whether a requested resource has been allocated to a requesting one of the plurality of operating systems before mapping one of the plurality of virtual addresses to a one of the plurality of physical addresses belonging to the requested resource; and if it is determined that the requested resource is not allocated to the logical partition to which the requesting one of the plurality of operating systems is allocated, the mediating component refrains from mapping the one of the plurality of virtual addresses to the one of the plurality of physical addresses belonging to the requested resource.

* * * * *

UNITED STATES PATENT AND TRADEMARK OFFICE
CERTIFICATE OF CORRECTION

PATENT NO. : 6,877,158 B1
DATED : April 5, 2005
INVENTOR(S) : Arndt

It is certified that error appears in the above-identified patent and that said Letters Patent is hereby corrected as shown below:

Column 10,
Line 7, before "partitions" insert -- logical --.
Line 10, after "each one" insert -- of --.

Signed and Sealed this

Thirtieth Day of May, 2006

JON W. DUDAS
*Director of the United States Patent and Trademark Office*